A. SULLY.
Army Wagon.
No. 82,472.  Patented Sept. 22, 1868.
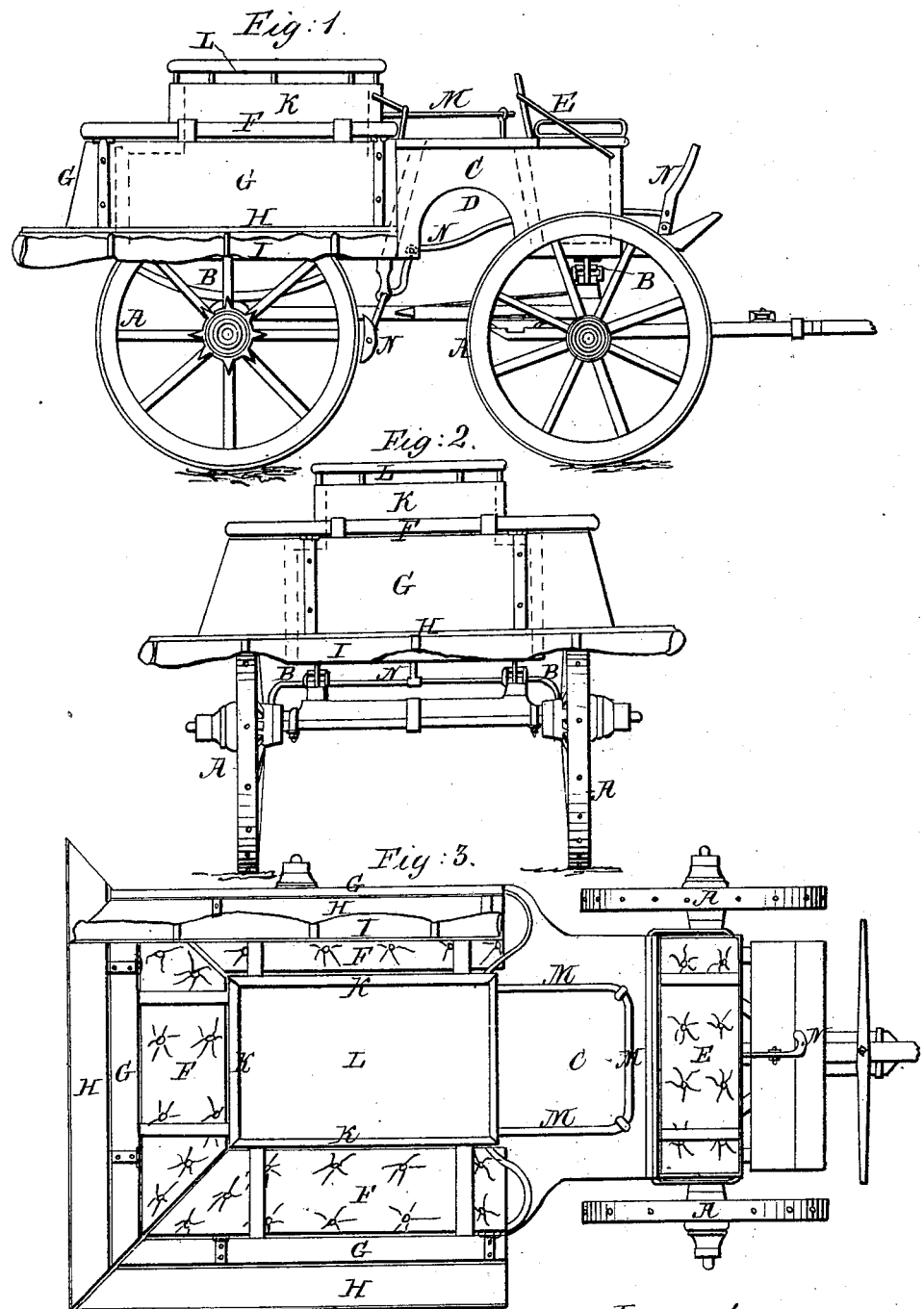

UNITED STATES PATENT OFFICE.

ALFRED SULLY, OF UNITED STATES ARMY.

IMPROVED ARMY-WAGON.

Specification forming part of Letters Patent No. 82,472, dated September 22, 1868.

*To all whom it may concern:*

Be it known that I, ALFRED SULLY, a lieutenant-colonel in the United States Army, have invented a new and useful Improvement in Wagons for the Rapid Transportation of Foot Soldiers on the Plains; and I do hereby declare the following to be a full, clear, and exact description thereof, reference being had to the annexed drawings, and to the letters of reference marked thereon.

The nature of my invention consists in the construction and arrangement of a light strongly-built wagon for the use of foot soldiers on the plains, when it is necessary to transport them rapidly, and so constructed that the men can jump off the seats in a moment if suddenly attacked, and spring into their seats again without delay. The wagons, moreover, are so constructed that if several of them are used together, if suddenly attacked by a large force they can form a corral by turning the front wheels square under the body, and tying the lead-mules to the rear wheels, and thus protect the mules from shot. The men, by jumping onto the inside seat, can fire over the top of the wagon, perfectly protected from the fire of the enemy. With four mules these wagons can readily carry ten men, their rations for four days, and half forage for the same time for the mules. They can move more rapidly, carry more fighting men for the same number of animals, and go farther in a day, than cavalry troops, and will thus be a great saving of expense.

In order to enable others skilled in the art to which my invention appertains to make and use the same, I will now proceed to describe its construction and operation, referring to the annexed drawings, which form a part of this specification, and in which—

Figure 1 is a side elevation; Fig. 2, a rear view; and Fig. 3 is a plan view.

A A represent the wheels of the wagon, which are nearly of the same size front and rear. On these wheels is hung the body C of the wagon, being supported by three half-elliptic and stiff springs, B B, which are placed, one under the front end of the wagon and the other two lengthwise under the rear end, so that the body of the wagon will hang low, and the springs must be stiff enough to allow the wagon to run steady.

In rear of the front wheels is a space marked D, cut out to allow the front wheels to make a square turn, thus allowing the wagon to move anywhere, and giving great advantage in protecting the animals that may draw the wagon, in case several of them are operating together, and it may be necessary to form a corral against attack.

E is the driver's seat, with a box underneath to hold forage, &c. A seat, F, runs around the two sides and back over the hind wheels, which seat should be raised above the wheels a few inches to prevent it from coming in contact with the wheels. The men will be seated on their seats facing outward, so that in case of a sudden attack they can jump from their seats and form in line of battle. From the outer edges of the seats, back of the men's legs, is a dash-board, G, slanting outward.

To prevent mud and water from the wheels splashing on the lower part of their legs, at the end of this dash-board is a foot-board, H, to rest against. The dash-board G, with its foot-board H, is hung to the outer edge of the seat F by hinges, so as to allow the wheels to be taken off to grease, when required.

Around the edge of the foot-board H is a tent, I, rolled up and strapped, which, when spread to the ground, shelters the men, and if drawn up over their legs protects them from cold and rain.

K is the back of the seats; L, opening back of the seats into the body of the wagon, where rations, baggage of men, &c., are carried. This is to be covered with a tent-fly. M is an iron railing inclosing a space on top of the wagon, where the men may lay their canteens, knapsacks, &c. N is the brake, placed so as to be easily operated by the driver.

The advantages of these wagons are obvious. They can carry, with the same number of animals, at least twice the number of fighting men the cavalry can, besides which they can carry rations and forage for a number of days for the men and animals. These wagons can move as rapidly, go as far, if not farther, in the same space of time, as the cavalry can, and with much less fatigue to the men, and they can be taken, with the assistance of the men in them, anywhere where any cavalry can go. As cavalry cannot use their carbines with any effect mounted, they invariably dismount to fight Indians. This necessitates a large portion of their force to hold the horses of those engaged. With these wagons, nobody except the driver will be required to take care of them. In case of a fight, they can make a close corral by turning the front wheels short and fastening the lead-horses to the rear of the wagon. By the use of these wagons the expense to the Government will be greatly reduced in the forage required for cavalry-horses on the plains, and the transportation required to haul forage for the cavalry-horses when they are operating against the Indians. These wagons will, in a great measure, do away with the use of cavalry, which is so expensive to maintain at frontier posts. The animals used to haul the infantry in case of an emergency, when not so employed would be used to haul stores and for ordinary garrison duty. These wagons are not only for the use of the infantry, but they could be partially used by the cavalry. Let there be in each troop of cavalry serving on the plains just a sufficient number of horses to keep up their organization and drill, and use these wagons when you wished to operate against Indians, or make a rapid concentration of troops at any one point, or when necessary to send out an escort. These wagons will not be heavier than an ordinary ambulance, and can be used as such, if necessary, by turning up the dash-boards and strapping them to the back of the seats, which will keep the wounded men from falling out.

Having thus fully described my invention, what I claim as new, and desire to secure by Letters Patent, is—

1. The body C, constructed as described, and provided with seats F F F and E, receptacle L, and railing M, all substantially as and for the purposes herein set forth.

2. In combination with the seats F F F, the hinged dash-boards G G G and foot-boards H H H, substantially as and for the purposes herein set forth.

3. In a wagon provided with suitable seats and foot-boards, the employment of sectional tent-pieces I I I, substantially as and for the purposes herein set forth.

4. The combination of the body C, seats F F F and E, railing M, receptacle L, dash-boards G G G, foot-boards H H H, and folding tent-pieces I I I, all as herein shown and described.

ALF. SULLY.

Witnesses:
  HENRY INMAN,
  WILLIAM F. GARDNER.